US012369096B2

(12) United States Patent
Pei et al.

(10) Patent No.: US 12,369,096 B2
(45) Date of Patent: Jul. 22, 2025

(54) UNIFIED QUALITY OF SERVICE MANAGEMENT OF AIRCRAFT DATA TRAFFIC THROUGH SATELLITE COMMUNICATION SYSTEM

(71) Applicant: The Boeing Company, Chicago, IL (US)

(72) Inventors: Guangyu Pei, Bellevue, WA (US); Anil Kumar, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 489 days.

(21) Appl. No.: 18/056,535

(22) Filed: Nov. 17, 2022

(65) Prior Publication Data
US 2024/0172082 A1 May 23, 2024

(51) Int. Cl.
*H04W 40/12* (2009.01)
*H04W 40/24* (2009.01)
*H04W 84/06* (2009.01)

(52) U.S. Cl.
CPC ......... *H04W 40/12* (2013.01); *H04W 40/248* (2013.01); *H04W 84/06* (2013.01)

(58) Field of Classification Search
None
See application file for complete search history.

(56) References Cited

U.S. PATENT DOCUMENTS

| 6,529,706 | B1 * | 3/2003 | Mitchell | H04B 7/18508 709/227 |
|---|---|---|---|---|
| 9,553,658 | B1 * | 1/2017 | Bantoft | H04B 7/18508 |
| 11,211,999 | B2 * | 12/2021 | Roy | H04L 12/4633 |
| 2010/0121938 | A1 * | 5/2010 | Saugnac | H04M 3/22 709/218 |
| 2019/0207674 | A1 | 7/2019 | Roy et al. | |

(Continued)

OTHER PUBLICATIONS

AECC: "Draft 3 of ARINC project paper 664:Aircraft data network, Part 5: Network domain characteristics and interconnection." Internet Citation, Nov. 4, 2004 (Nov. 4, 2004), XP002398177, Retrieved from the Internet: URL:http://web.archive.org/web/20050205154 16/www.arinc.com/aeec/draft_documents/664 p5_d3.pdf [retrieved on Sep. 8, 2006].

(Continued)

*Primary Examiner* — Brian S Roberts
(74) *Attorney, Agent, or Firm* — Yee & Associates, P.C.

(57) ABSTRACT

Managing aircraft satellite communication data traffic is provided. The method comprises calculating total available satellite communication bandwidth across a number of virtual local area networks (VLANs) of an onboard network of an aircraft and prioritizing data traffic for the VLANs according to a specified traffic priority and quality of service policies. The prioritized data is mapped to a number of unified device routing tables to maximize the available total satellite communication bandwidth and meet the quality of service policies. When data packets are received from the VLANs they are allocated across the total available satellite communication bandwidth based on the mapping. The data packets are then transmitted over a single continuously connected VLAN mapped to a satellite communication link from the aircraft to an end station.

20 Claims, 9 Drawing Sheets

(56) References Cited

U.S. PATENT DOCUMENTS

2022/0052904 A1    2/2022   Howard
2022/0312181 A1*  9/2022   Sumien ............ H04M 15/8351

OTHER PUBLICATIONS

ARINC: "Aircraft Network Server System (NSS) Functional Definition," ARINC 821 report, Prepared by AEEC, Dec. 9, 2008 (Dec. 9, 2008), XP055815772, Retrieved from the Internet: URL:https://standards.globalspec.com/std/1151776/arinc-821 [retrieved on Jun. 21, 2021].

European Patent Office Extended Search Report, dated Apr. 29, 2024, regarding Application No. EP23204782.9, 13 pages.

* cited by examiner

UNIFIED QUALITY OF SERVICE MANAGEMENT OF AIRCRAFT DATA TRAFFIC THROUGH SATELLITE COMMUNICATION SYSTEM

BACKGROUND INFORMATION

1. Field

The present disclosure relates generally to satellite communication, and more specifically to managing multiple satellite network links for all onboard network traffic that shares these links.

2. Background

Satellite communication allows aircraft to maintain connections with specific service provides on the ground through one or more intermediate satellites in orbit. Satellite communications may be used to provide passenger entertainment services as well as high-speed weather information to pilots, requiring high speeds and bandwidth.

With the move toward low earth orbit satellite networks airlines want reliable, low-cost connectivity with low latency. Currently, satellite communications for aircraft are provided in a "stove-piped" manner with each satellite service providers provisioning a separate VLAN to each aircraft. Each VLAN is negotiated between an airline and each service provider. Cost is based on how much bandwidth the airline want to use on the network. As more bandwidth capacity is added in the corresponding transponder, costs go up.

Therefore, it would be desirable to have an alternative analysis method and apparatus that take into account at least some of the issues discussed above, as well as other possible issues.

SUMMARY

The illustrative embodiments provide a computer-implemented method of managing aircraft satellite communication data traffic. The method comprise calculating total available satellite communication bandwidth across a number of virtual local area networks (VLANs) of an onboard network of an aircraft and prioritizing data traffic for the VLANs according to a specified traffic priority and quality of service policies. The prioritized data is mapped to a number of unified device routing tables to maximize the available total satellite communication bandwidth and meet the quality of service policies. When data packets are received from the VLANs they are allocated across the total available satellite communication bandwidth based on the mapping. The data packets are then transmitted over a single continuously connected VLAN mapped to a satellite communication link from the aircraft to an end station.

Another illustrative embodiment provides a system for managing aircraft satellite communication data traffic. The system comprises a storage device that stores program instructions and one or more processors operably connected to the storage device and configured to execute the program instructions to cause the system to: calculate total available satellite communication bandwidth across a number of virtual local area networks (VLANs) of an onboard network of an aircraft; prioritize data traffic for the VLANs according to a specified traffic priority and quality of service policies; map the prioritized data to a number of unified device routing tables to maximize the available total satellite communication bandwidth and meet the quality of service policies; receive data packets from the VLANs; allocate the data packets across the total available satellite communication bandwidth based on the mapping; and transmit the data packets over a single continuously connected VLAN mapped to a satellite communication link from the aircraft to an end station.

Another illustrative embodiment provides a computer program product for managing aircraft satellite communication data traffic. The computer program product comprises a computer-readable storage medium having program instructions embodied thereon to perform the steps of: calculating total available satellite communication bandwidth across a number of virtual local area networks (VLANs) of an onboard network of an aircraft; prioritizing data traffic for the VLANs according to a specified traffic priority and quality of service policies; mapping the prioritized data to a number of unified device routing tables to maximize the available total satellite communication bandwidth and meet the quality of service policies; receiving data packets from the VLANs; allocating the data packets across the total available satellite communication bandwidth based on the mapping; and transmitting the data packets over a single continuously connected VLAN mapped to a satellite communication link from the aircraft to an end station.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described herein. For example, the illustrative embodiments recognize and take into account that currently, satellite communications for aircraft are provided in a "stove-piped" manner with each satellite service providers provisioning a separate VLAN to each aircraft.

The illustrative embodiments also recognize and take into account that each VLAN is negotiated between an airline and each service provider. Cost is based on how much bandwidth the airline want to use on the network. As more bandwidth capacity is added in the corresponding transponder, costs go up.

The illustrative embodiments also recognize and take into account that taking aircraft information into computing clouds for real-time service creates a new computing environment with different types of satellites, different latencies, and different characteristics.

The illustrative embodiments also recognize and take into account that low earth orbit satellites have small beams close to earth with hotspots, requiring multiple handoffs between satellites and a given aircraft during flight.

The illustrative embodiments provide a unified network architecture and interface for all onboard network traffic and dynamically routes data traffic to a shared satellite communication link based on local onboard quality of service policies and total available shared bandwidth.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

Figure 1:
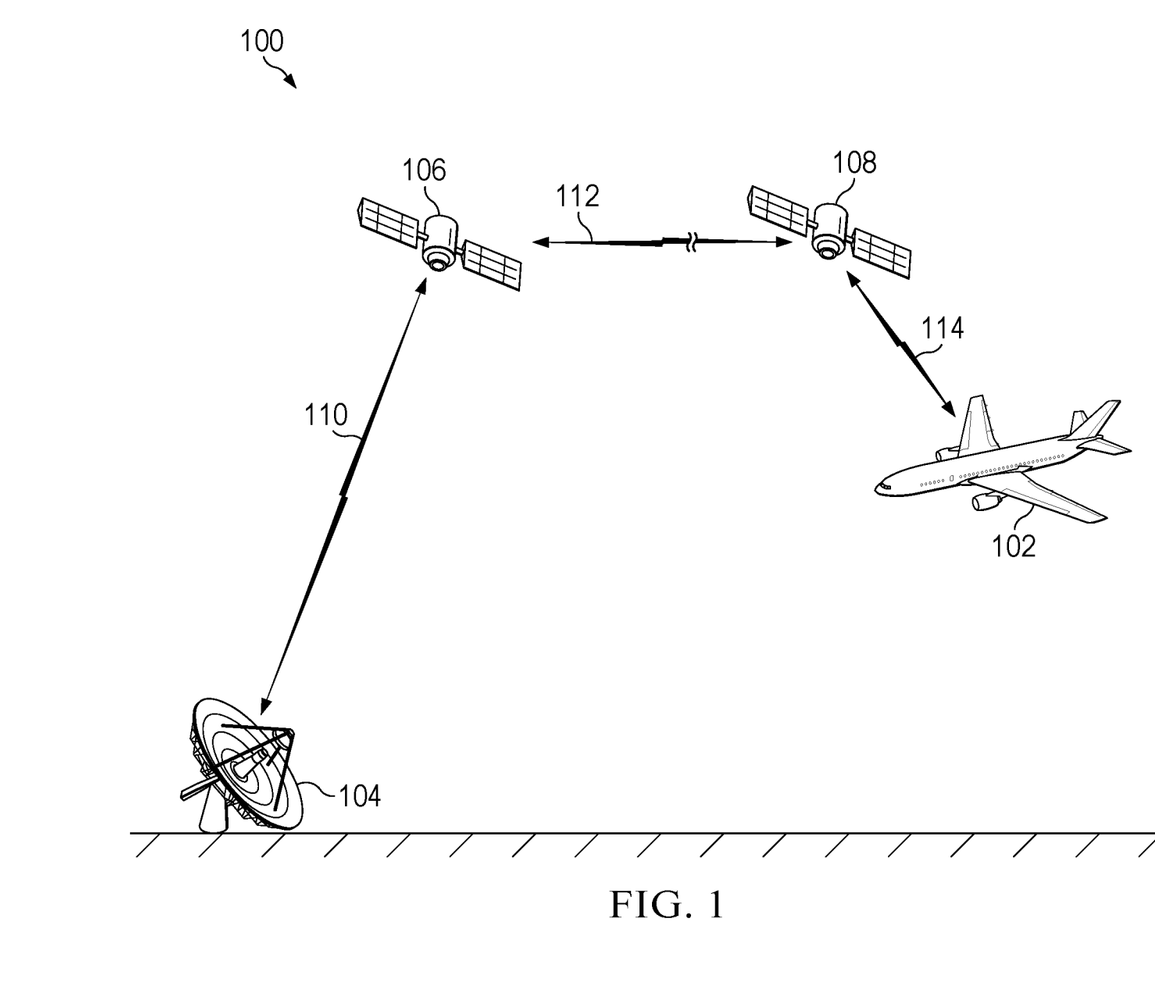
FIG. 1 depicts a satellite communications (SATCOM) network in which the illustrative embodiments can be employed.

FIG. 1 depicts a satellite communications network 100 in which the illustrative embodiments can be employed. Satellite communications (SATCOM) network 100 comprises a number of satellites 106, 108 in orbit. In an embodiment, satellites 106, 108 may comprise low earth orbit (LEO) satellites.

Aircraft 102 is able to maintain two-way communications with an end point ground station 104 via intermediate communications links 110, 112, 114.

Figure 2:
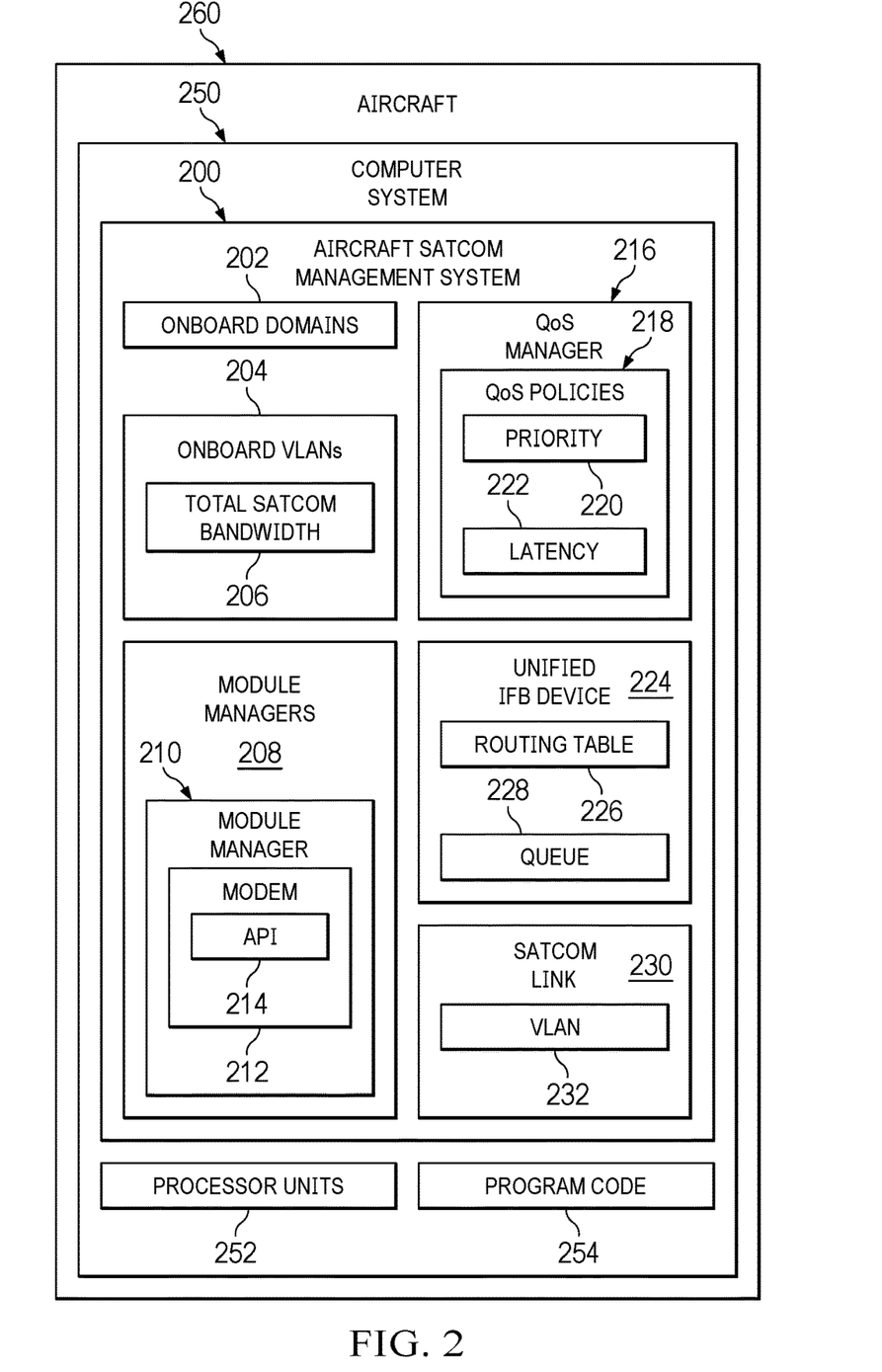
FIG. 2 depicts a block diagram of an aircraft SATCOM management system in accordance with an illustrative embodiment.

FIG. 2 depicts a block diagram of an aircraft SATCOM management system in accordance with an illustrative embodiment. Aircraft SATCOM management system 200 is deployed on an aircraft 260, which may be an example of aircraft 102 in FIG. 1.

Aircraft SATCOM management system 200 comprises a number of onboard domains 202. Examples of onboard domains include passenger owned device domain (PODD), passenger information and entertainment services domain (PIESD), and aircraft information services domain (AISD). The onboard domains 202 having corresponding onboard virtual local area networks (VLANs) 204 that connected the onboard domains with respective domain service provides on the ground. Among them, the onboard VLANs 204 have a combined total SATCOM bandwidth, which may be allocated by aircraft SATCOM management system 200 according to data traffic priority.

Data traffic for the VLANs 204 is managed by a number of module managers 208. Each module manager 210 comprises a modem 212 for establishing a SATCOM link 230 with a ground station endpoint for service providers. Each modem 212 has a respective application programming interface (API) 214.

A quality of service (QoS) manager 216 is able to determine the total SATCOM bandwidth 206 of onboard VLANs 204 based on queries from the module manager 208. QoS manager 216 allocates the total SATCOM bandwidth for data traffic to and from the onboard VLANs 204 according to a number of specified QoS policies 218. These QoS policies 218 prescribe the priority 220 and/or required latency 222 related to respective data traffic for the onboard domains 202. For example, in the case of online gaming provided to passengers, requires very low latency due to the requirement of near real-time interaction, whereas playback of a motion picture or music can take advantage of data buffering.

The QoS policies provided by QoS manager 216 are implemented and enforced by a unified intermediate functional block (IFB) device 224. Unified IFB device 224 comprises a routing table 226 that matches data packets from the respective onboard VLANs 204 with service provider endpoints on the ground. Routing table 226 allows the unified IFB device 224 to map the different onboard VLANs 204 to a single, continuously connected VLAN 232 over SATCOM link 230. Unified IFB device 224 comprises queue 228 which implements the priority 220 assign to data packets according to QoS policies 218.

Aircraft SATCOM management system 200 can be implemented in software, hardware, firmware, or a combination thereof. When software is used, the operations performed by aircraft SATCOM management system 200 can be implemented in program code configured to run on hardware, such as a processor unit. When firmware is used, the operations performed by sonic fatigue analysis system 200 can be implemented in program code and data and stored in persistent memory to run on a processor unit. When hardware is employed, the hardware can include circuits that operate to perform the operations in aircraft SATCOM management system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
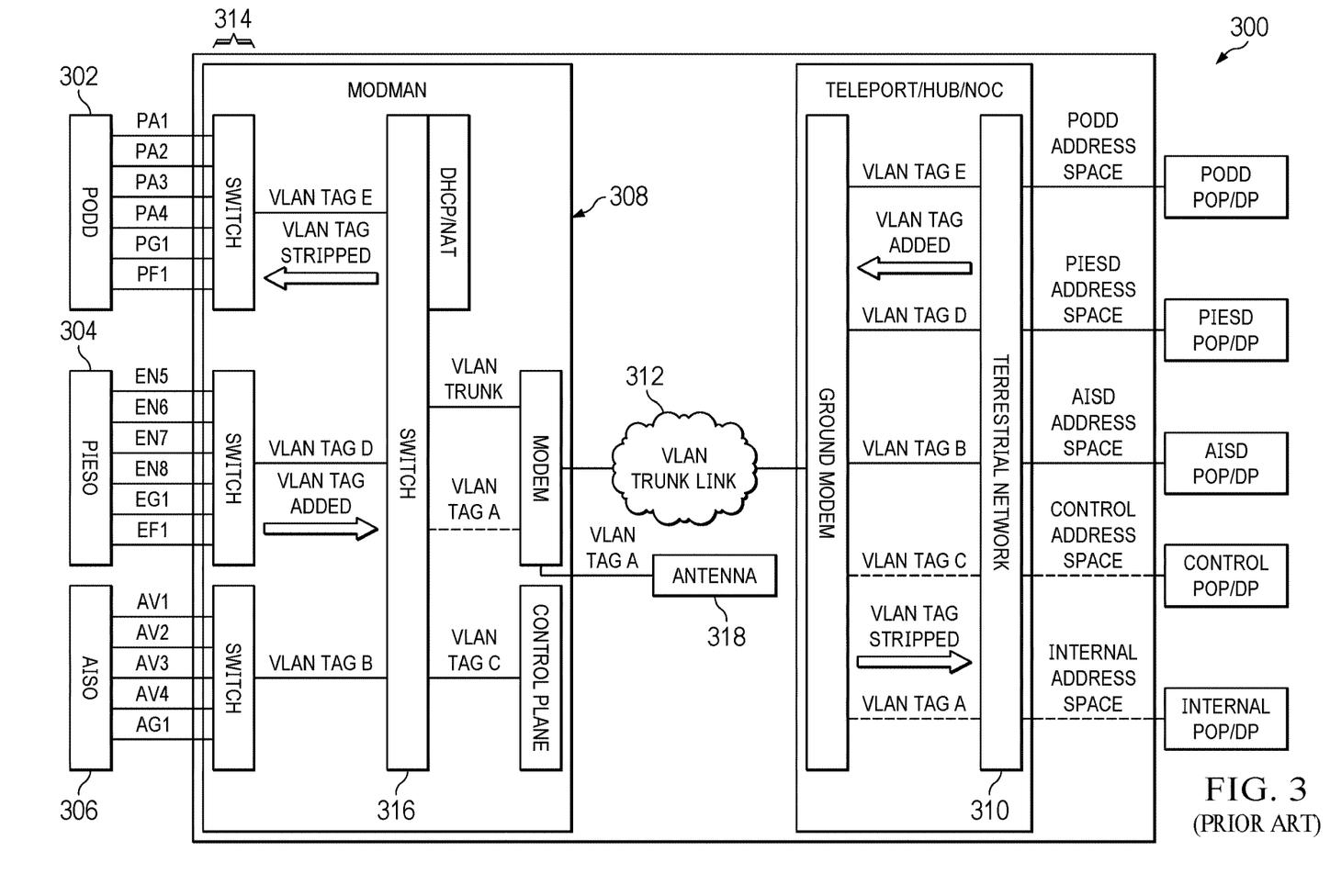
FIG. 3 depicts block diagram of an example SATCOM architecture in accordance with the prior art.

FIG. 3 depicts block diagram of an example SATCOM architecture in accordance with the prior art. SATCOM architecture 300 may be, for example, a Ku/Ka-band ARINC 791 architecture.

SATCOM architecture 300 provides communication between a number of onboard domains and respective service domains on the ground. The domains onboard the aircraft may include PODD 302, PIESD 304, and AISD 306. Each of the onboard domains 302, 304, 306 comprises a respective VLAN.

A module manager (modman) 308 controls communication with a terrestrial network 310 through a VLAN trunk link 312 that passes through a number of satellites such as satellites 106, 108 in FIG. 1. Module manager 308 adds respective VLAN tags to outgoing data packets received from the respective onboard VLAN switches 314 before transmitting them over VLAN trunk link 312. Conversely, module manager 308 strips the VLAN tags from incoming data packets when they are routed to their respective VLAN switches 314.

Currently, each SATCOM service provider provisions individual VLANs for each traffic class (domain) to an airline, regardless of its actual usage. Therefore, there is no dynamic load balancing across traffic classes. There is a discrete SATCOM module manager for each service provider with no dynamic link sharing/routing when multiple SATCOM links exist. Therefore, current architectures represented by SATCOM architecture 300 comprise "stovepipe" architectures from the antenna 318 to the module manager switch 316, which entails a high size, weight, and power (SWaP) and cost for multiple SATCOM systems.

Figure 4:
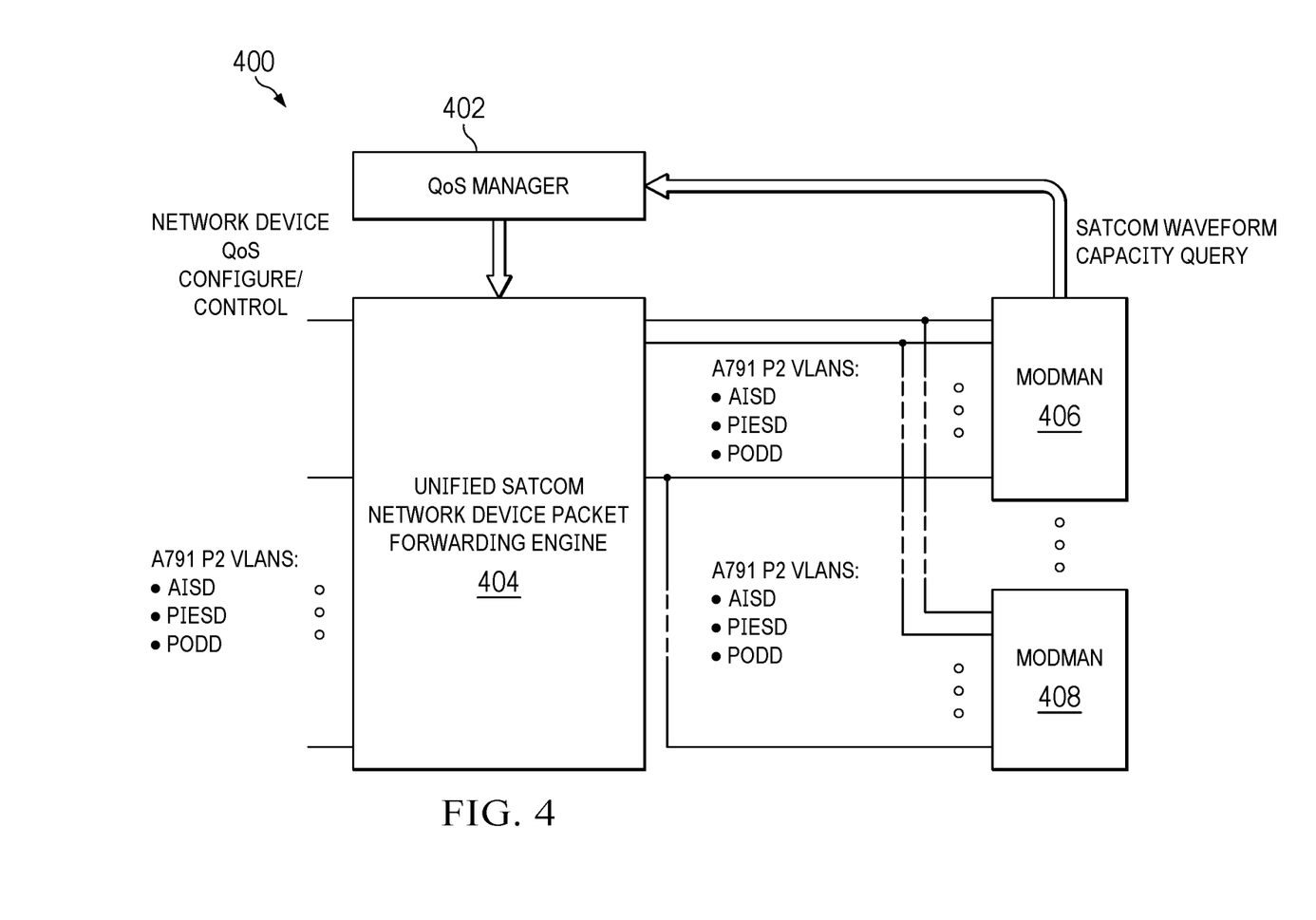
FIG. 4 depicts a block diagram of a unified SATCOM QoS controller in accordance with an illustrative embodiment.

FIG. 4 depicts a block diagram of a unified SATCOM QoS controller in accordance with an illustrative embodiment. SATCOM QoS controller 400 comprises a QoS manager 402 and a unified SATCOM network device packet forwarding engine 404. SATCOM QoS controller 400 provides a unified network device construct to perform traffic control for bandwidth allocation, queuing scheduling and policing.

In the present example, QoS manager 402 is able to determine total available SATCOM bandwidth based on periodic SATCOM waveform capacity queries received from a number of module managers 406, 408, each of which manages a number of respective onboard VLANs.

The unified SATCOM network device packet forwarding engine 404 maps data packets from the different onboard VLANs to a single SATCOM VLAN according to the total available bandwidth and QoS policies provided by the QoS manager 402. Continuing the example of the ARINC 791 architecture above, SATCOM QoS controller 400 is able to preserve the A791 part 2 network architecture in terms of VLAN separation and Ethernet hardware interface. SATCOM QoS controller 400 enables flexible QoS management within single SATCOM waveform as well as enabling support of multiple discrete SATCOM waveforms simultaneously.

Figure 5:
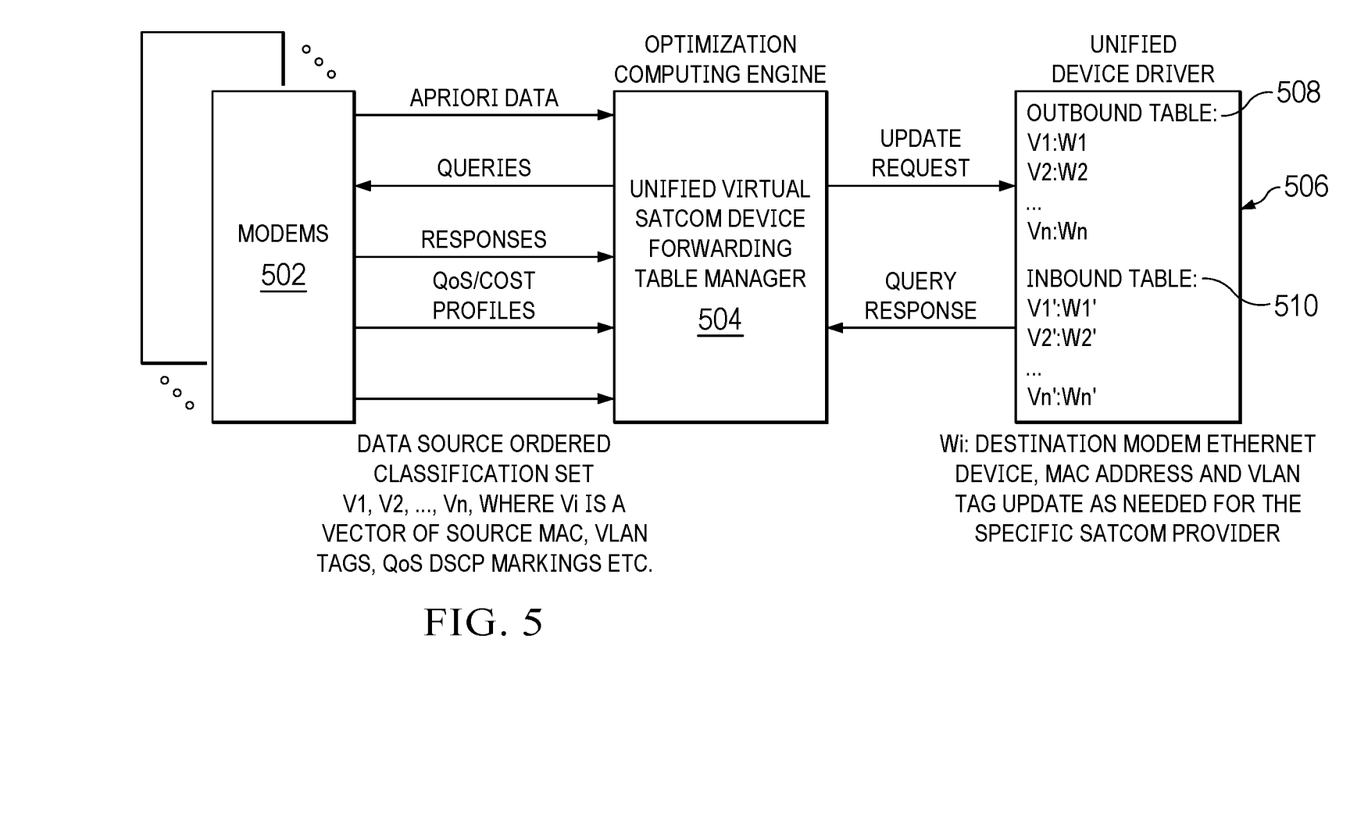
FIG. 5 depicts a block diagram illustrating the information flow for management of a satellite virtual network in accordance with an illustrative embodiment.

FIG. 5 depicts a block diagram illustrating the information flow for management of a satellite virtual network in accordance with an illustrative embodiment. FIG. 5 is an example illustration of the operation of unified SATCOM network device packet forwarding engine 404 in FIG. 4.

An optimization computing engine 504 serves as a unified virtual SATCOM device forwarding table manager. Optimization engine is able to allocate data packets from different onboard VLANs across the total available SATCOM bandwidth by mapping the data packets to a number of routing tables 508, 510 maintained by a unified device driver 506. Optimization computing engine 504 receives data packets from VLAN modems 502 and uses the routing tables 508, 510 to match a data source ordered classification set V1, V2, ..., Vn to a data destination ordered classification set W1, W2, ..., Wn. In the present example, each Vi comprises a vector denoting, e.g., source media access control (MAC), VLAN tag, QoS differential services code point (DSCP) markings, etc. Conversely, each Wi comprises a vector denoting, e.g., a destination modem ethernet device, MAC address, and VLAN tag update as needed for a specific SATCOM service provider.

For outbound data traffic, optimization computing engine 504 uses outbound routing table 508 to match each Vi vector with the corresponding Wi vector. Conversely, for inbound data traffic, optimization computing engine 504 uses inbound routing table 510 to match each Wi vector with the corresponding Vi vector.

Figure 6:
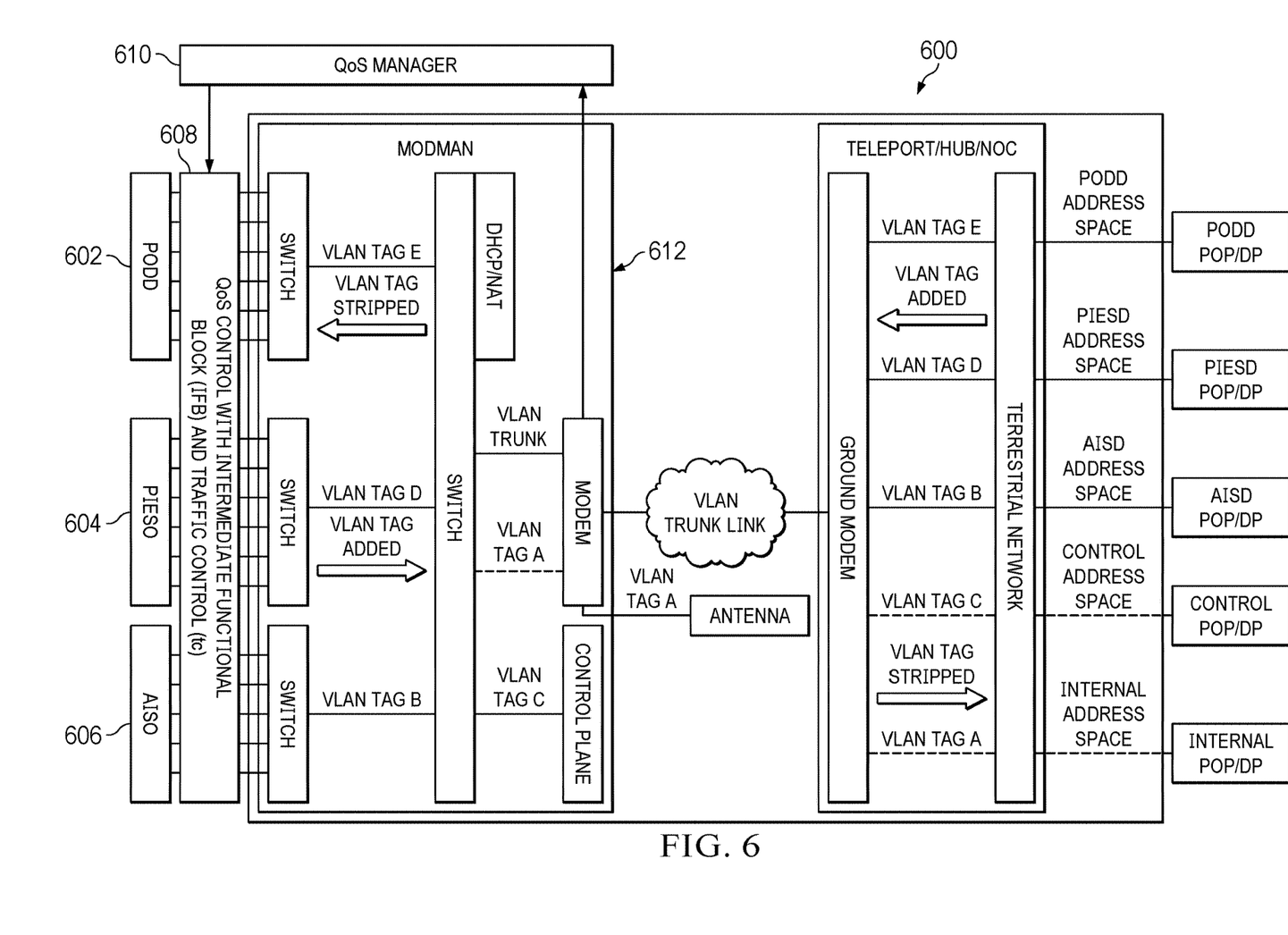
FIG. 6 depicts a block diagram illustrating an example of an aircraft SATCOM management system that manages a single module manager at a time in accordance with an illustrative embodiment.

FIG. 6 depicts a block diagram illustrating an example of an aircraft SATCOM management system that manages a single module manager at a time in accordance with an illustrative embodiment.

In this embodiment, SATCOM architecture 600 comprises unified QoS and traffic control device implemented as a baseline Linux IFB 608. IFB 608 is located between the VLANs 602-606 of the onboard network and a generalized virtual satellite communication device provided by module manager 612. All VLAN corresponding devices register their packet flow hook functions with IFB 608. The IFB 608 can then apply traffic control for those devices.

QoS manager 610 calculates the total available bandwidth from periodic queries to the module manager message API (e.g., iDrect modem API for tx/rx status message). Based on total available bandwidth, QoS manager 610 configures and controls the IFB 608 for all VLAN links attached to IFB 608 based on user traffic priority and QoS policies. The IFB device implement and enforce the QoS specified by QoS manager. The IFB 608 uses QoS queuing scheduling to implement and enforce the QoS policies specified by QoS manager 610. In this case shown in FIG. 6, there is no routing function in IFB 608 when those network filter functions are called.

The illustrative embodiments support any SATCOM transmission control protocol (TCP) enhancement protocols. For example, the TCP performance enhancement proxies (PEP) can leverage the QoS manager to maximize TCP performance over high bandwidth delay product links. As another example, end-to-end protocols such as Google® QUIC can run as is with no modification.

Figure 7:
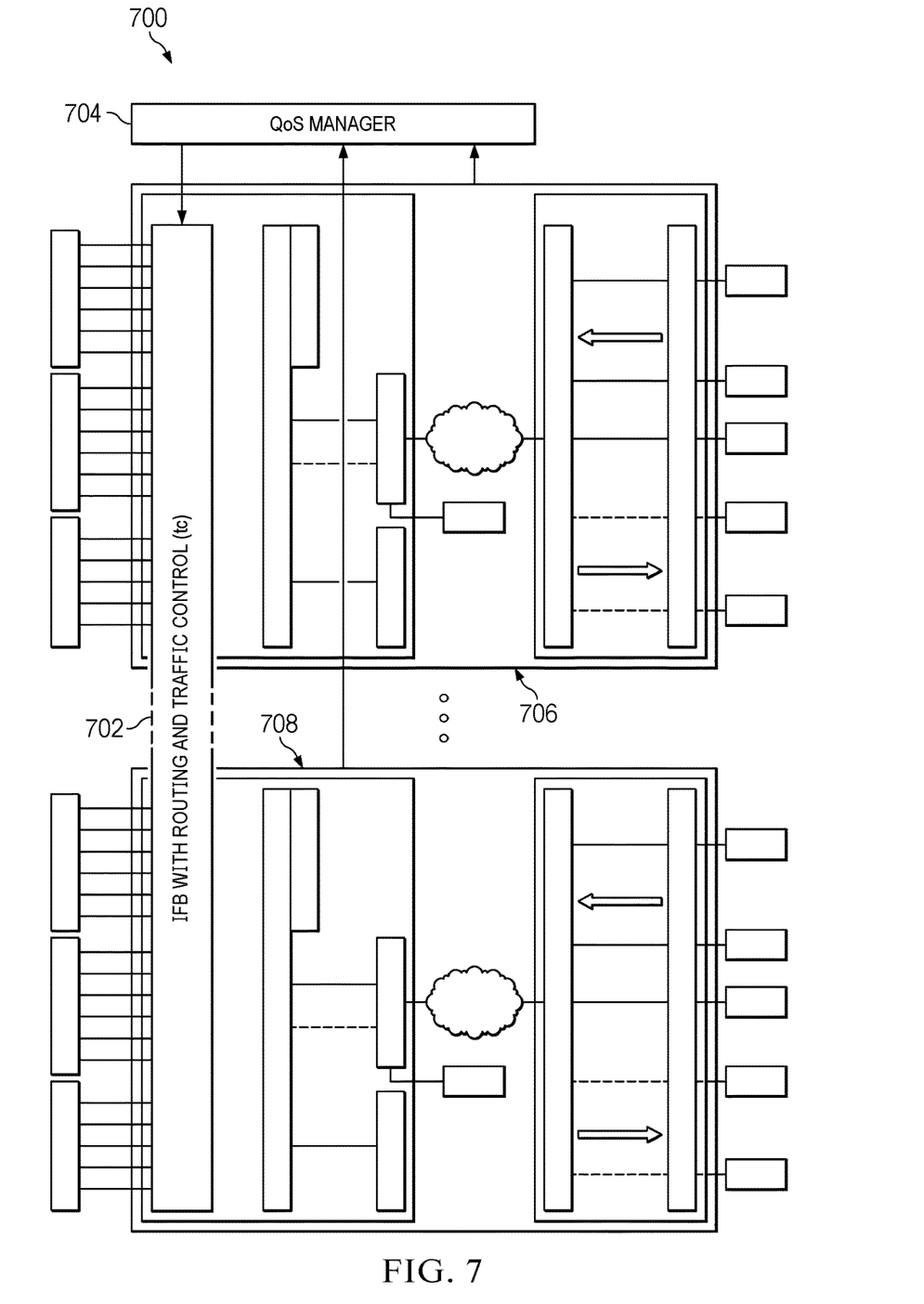
FIG. 7 depicts a block diagram illustrating an example of an aircraft SATCOM management system that manages multiple module managers concurrently in accordance with an illustrative embodiment.

FIG. 7 depicts a block diagram illustrating an example of an aircraft SATCOM management system that manages multiple module managers concurrently in accordance with an illustrative embodiment. Similar to SATCOM architecture 600 in FIG. 6, SATCOM architecture 700 employs a unified IFB 702 and QoS manager 704. However, in this embodiment, the unified IFB 702 comprises routing and switching capability when data packets flow through the device. In addition to QoS queuing scheduling, IFB 702 will first route the data packet to the proper outgoing interface based on the route configured by QoS Manager 704. There is a routing table (e.g., outbound table 508, inbound table 510) stored by the IFB 704 based on device IDs registered with this unified SATCOM network device.

The QoS manager 704 calculates the total available bandwidth based on periodic queries from each of the module managers 706, 708. Based on total available bandwidth and cost policy, QoS manager 704 configures and controls the unified IFB 702 for both routing and QoS parameters. The IFB 702 implements and enforces the QoS policies specified by the QoS manager 704.

The illustrative embodiments may also employ software defined SATCOM waveforms. Such an implementation comprises an architecture similar to SATCOM architecture 700 in FIG. 7 with a unified IFB device that routing and queuing functions to implement and enforce QoS policies supplied by a QoS manager according to total available bandwidth. However, in this embodiment the terminal may comprise a broadband antenna that supports both Ka and Ku bands and a modem than can support multiple waveforms. The terminal may comprise multiple modems and electronic steering for multiple beams and support multiple SATCOM links concurrently over multiple beams.

The SATCOM forward link direction comprises data traffic from the ground node outgoing interface to over-the-air transmission to the aircraft incoming interface. From the aircraft incoming interface, the data traffic then moves through the IFB to the QoS manager and is redirected back to the aircraft incoming interface, wherein it is directed to the unified SATCOM network device and then to the ethernet port to onboard networks. The unified SATCOM network device can be thought of as a bridge that holds input and output interfaces from multiple SATCOM modems and onboard network interfaces. This bridge device functions to route packets from different ports that are connected to the bridge.

The return link direction proceeds from the ethernet ports from onboard networks to the unified SATCOM network device to the outgoing modem interface and then to the QoS manager before over-the-air transmission to the incoming interface on the ground. It should be noted that the IFB is not needed on the return link path because the illustrative embodiments can apply QoS on the outgoing interface directly.

The IFB acts as a mapping/redirecting device to map incoming data flows to outgoing data flows. In current SATCOM approaches, forward link QoS is performed on the outgoing interface at the ground station. Because the illustrative embodiments perform the QoS operation onboard the aircraft, the incoming aircraft data flow is mapped to the IFB before applying QoS on the output of the IFB, which then goes to the unified SATCOM network device.

Therefore, the IFB is a mapping construct that is used for the forward link direction, whereas the unified SATCOM network device provides routing and switching functions.

Figure 8:
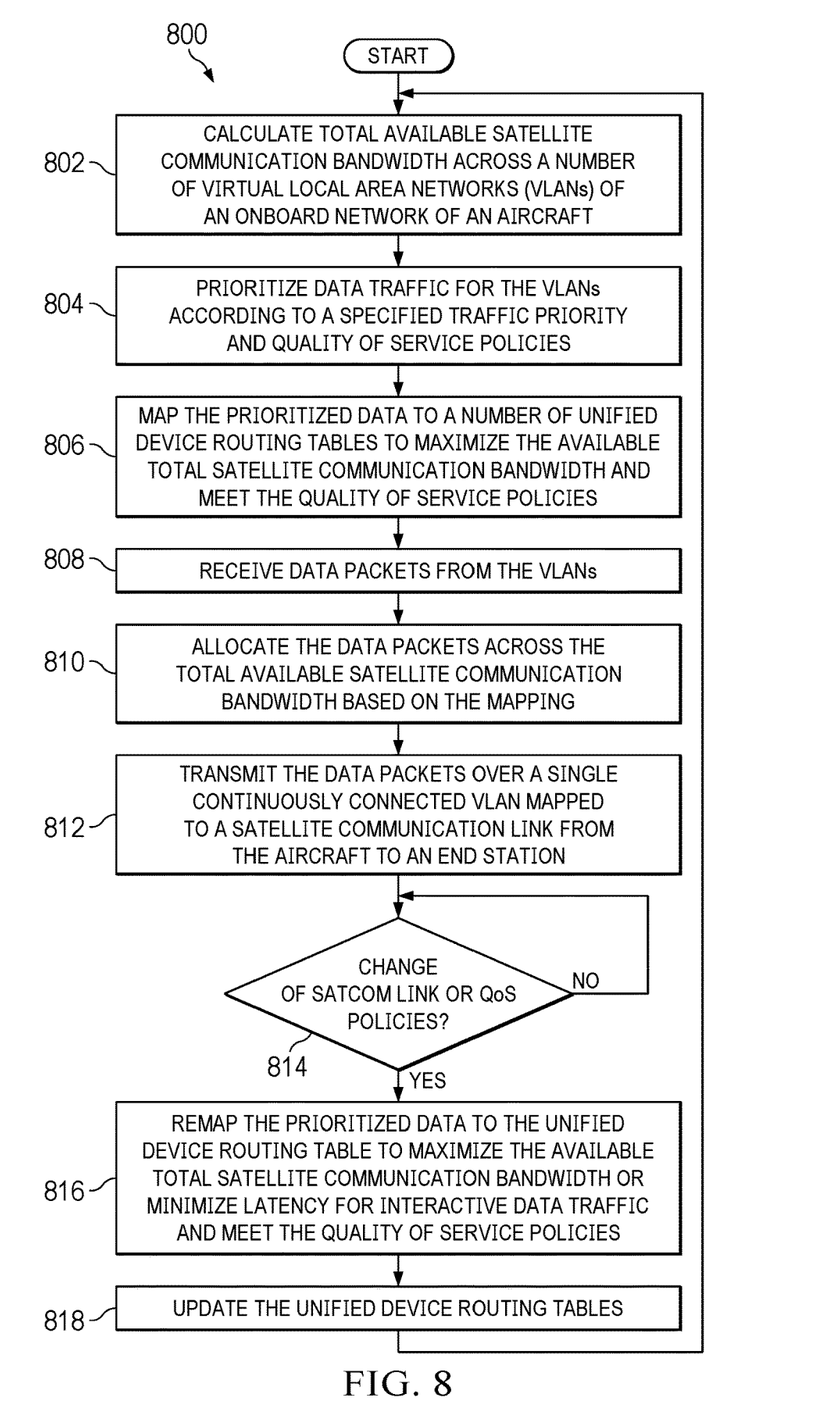
FIG. 8 depicts a flowchart illustrating a process for managing aircraft satellite communication data traffic in accordance with an illustrative embodiment.

FIG. 8 depicts a flowchart illustrating a process for managing aircraft satellite communication data traffic in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in aircraft SATCOM management system 200 in FIG. 2.

Process 800 begins by calculating total available satellite communication bandwidth across a number of virtual local area networks (VLANs) of an onboard network of an aircraft (operation 802). The total available satellite communications bandwidth may be calculated based on periodic queries from respective module managers of the VLANS. The total bandwidth may be obtained from modem application programming interfaces.

Data traffic for the VLANs is prioritized according to a specified traffic priority and quality of service policies (operation 804).

The prioritized data is then mapped to a number of unified device routing tables to maximize the available total satellite communication bandwidth and meet the quality of service policies (operation 806). The unified device routing table matches data packet headings with destination VLAN modems.

When data packets are received from the VLANs of the onboard network (operation 808), the data packets are allocated across the total available satellite communication bandwidth based on the mapping (operation 810). An intermediate function block may provide data packet routing between a satellite communication link and the VLANs of the onboard network for managing in-bound traffic quality of service to onboard end points. The intermediate function block may be located between the VLANs of the onboard network and a generalized virtual satellite communication device. Devices corresponding to the VLANs may register respective packets hook functions with the intermediate function block.

The data packets are transmitted over a single continuously connected VLAN mapped to the satellite communication link from the aircraft to an end station (812).

Process 800 continually monitors for a change of satellite communications link or quality of service policies (operation 814). Responsive to a change of satellite communications link (e.g., handoff from one satellite to another) or quality of service policies, process 800 remaps the prioritized data to the unified device routing table to maximize the available total satellite communication bandwidth or minimize latency for interactive data traffic and meet the quality of service policies (operation 816). Process 800 updates the unified device routing tables (operation 818) and returns to operation 802. Process 800 continues as long as the VLAN services and functions are operating on the aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
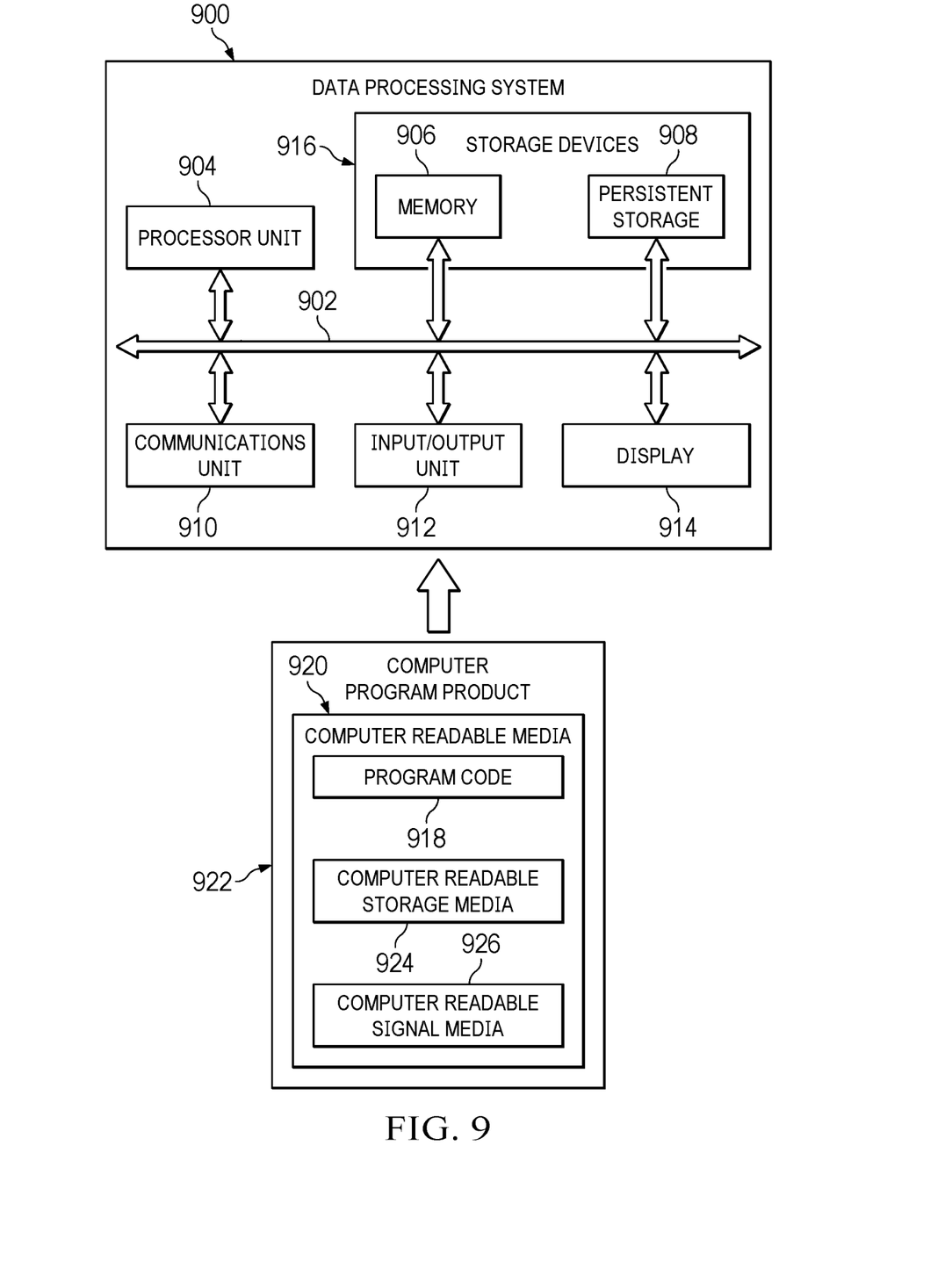
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer system 250 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable-storage media 924 is a physical or tangible storage device used to store program code 918 rather than a medium that propagates or transmits program code 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of managing aircraft satellite communication data traffic, the method comprising:
   calculating total available satellite communication bandwidth across a number of virtual local area networks (VLANs) of an onboard network of an aircraft;
   prioritizing data traffic for the VLANs according to a specified traffic priority and quality of service policies;
   mapping the prioritized data to a number of unified device routing tables to maximize the available total satellite communication bandwidth and meet the quality of service policies;
   receiving data packets from the VLANs;
   allocating the data packets across the total available satellite communication bandwidth based on the mapping; and
   transmitting the data packets over a single continuously connected VLAN mapped to a satellite communication link from the aircraft to an end station.

2. The method of claim 1, wherein the total available satellite communications bandwidth is calculated based on periodic queries from respective module managers of the VLANS.

3. The method of claim 1, wherein the unified device routing table matches data packet headings with destination VLAN modems.

4. The method of claim 1, wherein an intermediate function block provides data packet routing between the satellite communication link and the VLANs of the onboard network for managing in-bound traffic quality of service to onboard end points.

5. The method of claim 4, wherein the intermediate function block is located between the VLANs of the onboard network and a generalized virtual satellite communication device.

6. The method of claim 1, wherein multiple data traffic classes are managed with at least one of:
   a single satellite communications waveform;
   multiple discrete satellite communications waveforms; or
   a software defined satellite communications waveform.

7. The method of claim 1, further comprising, responsive to a change of satellite communications link or quality of service policies:
   remapping the prioritized data to the unified device routing table to maximize the available total satellite communication bandwidth or minimize latency for interactive data traffic and meet the quality of service policies; and
   updating the unified device routing tables.

8. A system for managing aircraft satellite communication data traffic, the system comprising:
   a storage device that stores program instructions; and
   one or more processors operably connected to the storage device and configured to execute the program instructions to cause the system to:
   calculate total available satellite communication bandwidth across a number of virtual local area networks (VLANs) of an onboard network of an aircraft;
   prioritize data traffic for the VLANs according to a specified traffic priority and quality of service policies;
   map the prioritized data to a number of unified device routing tables to maximize the available total satellite communication bandwidth and meet the quality of service policies;
   receive data packets from the VLANs;
   allocate the data packets across the total available satellite communication bandwidth based on the mapping; and
   transmit the data packets over a single continuously connected VLAN mapped to a satellite communication link from the aircraft to an end station.

9. The system of claim 8, wherein the total available satellite communications bandwidth is calculated based on periodic queries from respective module managers of the VLANS.

10. The system of claim 8, wherein the unified device routing table matches data packet headings with destination VLAN modems.

11. The system of claim 8, wherein an intermediate function block provides data packet routing between the satellite communication link and the VLANs of the onboard network for managing in-bound traffic quality of service to onboard end points.

12. The system of claim 11, wherein the intermediate function block is located between the VLANs of the onboard network and a generalized virtual satellite communication device.

13. The system of claim 11, wherein the processors further execute instructions to, responsive to a change of satellite communications link or quality of service policies:
   remap the prioritized data to the unified device routing table to maximize the available total satellite communication bandwidth or minimize latency for interactive data traffic and meet the quality of service policies; and
   update the unified device routing tables.

14. The system of claim 8, wherein multiple data traffic classes are managed with at least one of:
a single satellite communications waveform;
multiple discrete satellite communications waveforms; or
a software defined satellite communications waveform.

15. A computer program product for managing aircraft satellite communication data traffic, the computer program product comprising:
a non-transitory computer-readable storage medium having program instructions embodied thereon to perform the steps of:
calculating total available satellite communication bandwidth across a number of virtual local area networks (VLANs) of an onboard network of an aircraft;
prioritizing data traffic for the VLANs according to a specified traffic priority and quality of service policies;
mapping the prioritized data to a number of unified device routing tables to maximize the available total satellite communication bandwidth and meet the quality of service policies;
receiving data packets from the VLANs;
allocating the data packets across the total available satellite communication bandwidth based on the mapping; and
transmitting the data packets over a single continuously connected VLAN mapped to a satellite communication link from the aircraft to an end station.

16. The computer program product of claim 15, wherein the total available satellite communications bandwidth is calculated based on periodic queries from respective module managers of the VLANS.

17. The computer program product of claim 15, wherein the unified device routing table matches data packet headings with destination VLAN modems.

18. The computer program product of claim 15, wherein an intermediate function block provides data packet routing between the satellite communication link and the VLANs of the onboard network for managing in-bound traffic quality of service to onboard end points.

19. The computer program product of claim 18, wherein the intermediate function block is located between the VLANs of the onboard network and a generalized virtual satellite communication device.

20. The computer program product of claim 15, further comprising instructions for, responsive to a change of satellite communications link or quality of service policies:
remapping the prioritized data to the unified device routing table to maximize the available total satellite communication bandwidth or minimize latency for interactive data traffic and meet the quality of service policies; and
updating the unified device routing tables.

\* \* \* \* \*